US011903114B2

(12) United States Patent
Egenter et al.

(10) Patent No.: US 11,903,114 B2
(45) Date of Patent: Feb. 13, 2024

(54) METHOD FOR OPERATING AN INDUCTION HOB AND INDUCTION HOB

(71) Applicant: E.G.O. Elektro-Geraetebau GmbH, Oberderdingen (DE)

(72) Inventors: Christian Egenter, Bretten (DE); Max-Felix Mueller, Oberderdingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 306 days.

(21) Appl. No.: 17/303,557

(22) Filed: Jun. 2, 2021

(65) Prior Publication Data

US 2021/0385912 A1 Dec. 9, 2021

(30) Foreign Application Priority Data

Jun. 5, 2020 (DE) ..................... 10 2020 207 103.9

(51) Int. Cl.
*H05B 6/06* (2006.01)
*H05B 6/04* (2006.01)

(52) U.S. Cl.
CPC ............... *H05B 6/062* (2013.01); *H05B 6/04* (2013.01)

(58) Field of Classification Search
CPC ....... H05B 6/04; H05B 6/062; H05B 2213/05
See application file for complete search history.

(56) References Cited

U.S. PATENT DOCUMENTS 10,813,177 B2 10/2020 Park et al.
2008/0203087 A1 8/2008 Schilling et al.
(Continued)

FOREIGN PATENT DOCUMENTS

DE 19517874 A1 11/1995
DE 102009047185 A1 6/2011
(Continued)

OTHER PUBLICATIONS

German Patent and Trade Mark Office, Office Action received for Application No. 102020207103.9, dated May 17, 2021, 8 pages, Germany.

(Continued)

*Primary Examiner* — Dana Ross
*Assistant Examiner* — Kuangyue Chen
(74) *Attorney, Agent, or Firm* — Alston & Bird LLP

(57) ABSTRACT

A method for operating an induction hob (100), wherein the induction hob (100) comprises: an inverter (1), which is supplied with a supply voltage (US), at least one capacitor (2, 3), and an induction heating coil (4), wherein the at least one capacitor (2, 3) and the induction heating coil (4) are interconnected such that they constitute an oscillating circuit (5), and wherein the inverter (1) is configured to generate a pulse-width modulated excitation voltage (UA) for the oscillating circuit (5) from the supply voltage (US), wherein the method comprises the following steps: a) generation of the pulse-width modulated excitation voltage (UA) having a predefined voltage characteristic, b) measurement of a resulting oscillating circuit current (iS), particularly by means of the induction heating coil (4), c) determination of electrical oscillating circuit parameters, according to the voltage characteristic of the pulse-width modulated excitation voltage (UA) and the measured oscillating circuit current (iS), d) n-times repetition of steps a) to c) using a different voltage characteristic of the excitation voltage (UA) for the determination of electrical voltage characteristic-dependent oscillating circuit parameters, and e) determination of operating variables of the induction hob (100) from voltage characteristic-dependent electrical oscillating circuit parameters.

12 Claims, 3 Drawing Sheets

(56) References Cited

U.S. PATENT DOCUMENTS

| | | | | |
|---|---|---|---|---|
| 2011/0120989 | A1 | 5/2011 | Schilling et al. | |
| 2018/0063897 | A1* | 3/2018 | Park | H05B 6/065 1/2 |

FOREIGN PATENT DOCUMENTS

| | | | | |
|---|---|---|---|---|
| EP | 2360989 | A1 | 8/2011 | |
| EP | 2645814 | A1 * | 10/2013 | H05B 6/065 |
| EP | 2645814 | A1 | 10/2013 | |
| EP | 3291643 | A1 | 3/2018 | |

OTHER PUBLICATIONS

European Patent Office, Extended European Search Report received for Application No. 21176540.9, dated Oct. 15, 2021, 11 pages, Germany.

* cited by examiner

METHOD FOR OPERATING AN INDUCTION HOB AND INDUCTION HOB

CROSS-REFERENCE TO RELATED APPLICATIONS

This application claims priority to German Application No. 10 2020 207 103.9, filed Jun. 5, 2020, the contents of which are hereby incorporated herein in its entirety by reference.

BACKGROUND OF THE INVENTION

The invention relates to a method for operating an induction hob, and to an induction hob.

The object of the invention is the provision of a method for operating an induction hob, and the provision of an induction hob which permits the most reliable definition possible of operating variables for said induction hob.

DETAILED DESCRIPTION OF THE INVENTION

The method is employed for operating an induction hob.

The induction hob comprises at least one conventional inverter, which is supplied with a supply voltage. The supply voltage is preferably a DC voltage. The inverter can comprise, for example, a conventionally connected inverter branch circuit having two semiconductor switching means. With respect hereto, reference should also be made to the relevant specialized literature.

The induction hob further comprises at least one capacitor.

The induction hob further comprises at least one induction heating coil or inductor, which is assigned to a hob plate and is provided for the generation of an alternating magnetic field in the base of a pan which is to be heated. With respect hereto, reference should also be made to the relevant specialized literature.

The at least one capacitor and the induction heating coil are interconnected such that they constitute an oscillating circuit, for example a parallel or series oscillating circuit.

The inverter is provided for the generation, from the supply voltage, of a pulse-width modulated excitation voltage for the oscillating circuit. The pulse-width modulated excitation voltage is typically a square-wave voltage having a constant or variable pulse duty factor or pulse duty ratio, and a constant or variable period of oscillation or frequency. With respect hereto, reference should also be made to the relevant specialized literature.

The method comprises the following steps:

Step a), generation of the pulse-width modulated excitation voltage having a predefined voltage characteristic.

Step b), measurement of a resulting or configured oscillating circuit current, particularly by means of the induction heating coil.

Step c), determination of electrical oscillating circuit parameters, particularly in the form of an oscillating circuit impedance, according to the voltage characteristic of the pulse-width modulated excitation voltage and the measured oscillating circuit current. Electrical oscillating circuit parameters or the oscillating circuit impedance can describe, for example, the equivalent electrical parameters R and L of the induction heating coil with the cooking vessel positioned thereupon, or electrical impedances which can be inferred therefrom, or variables in the oscillating differential equation such as, for example, quality of conformance or damping, or the natural frequency. In principle, for example, for the determination of electrical oscillating circuit parameters, the well-known vector calculation method can be employed, i.e. the magnitude and phase of the voltage and the magnitude and phase of the current are considered in relation to one another.

Step d), n-times repetition of steps a) to c) using a different voltage characteristic of the excitation voltage for the determination of voltage characteristic-dependent oscillating circuit parameters. For the variation of the voltage characteristic of the excitation voltage, preferably only a voltage difference between a low level of the pulse-width modulated excitation voltage and a high level of the pulse-width modulated excitation voltage is varied. A frequency and a pulse duty factor of the pulse-width modulated excitation voltage preferably remain unchanged. The number n is a whole number and lies, for example, within a numerical range between 1 and 400. The number n can be dependent, for example, upon a period of oscillation of pulse-width modulation, or the number n can be selected such that the steps are repeated for the duration of an entire network half-wave.

Step e), determination (measurement) of operating variables of the induction hob based on the voltage characteristic-dependent oscillating circuit parameters.

According to one form of embodiment, for the variation of the voltage characteristic of the excitation voltage, in particular exclusively, the supply voltage of the inverter is varied, as a result of which the voltage difference between the high level and the low level of the pulse-width modulated excitation voltage varies correspondingly, for example.

According to one form of embodiment, a pulse duty factor of the pulse-width modulated excitation voltage and/or a period of oscillation of the pulse-width modulated excitation voltage remain/remains constant during steps a) to e).

According to one form of embodiment, operating variables to be determined are selected from the following: degree of coverage of the induction heating coil by a cooking vessel which is to be heated, particularly having a ferromagnetic base, the material of the cooking vessel which covers the induction heating coil, or the material of the base of the cooking vessel, and the temperature of the base of the cooking vessel which covers the induction heating coil. The degree of coverage can depend, for example, upon whether the coverage of the induction heating coil by the cooking vessel is total, partial or entirely non-existent.

According to one form of embodiment, the induction hob further comprises the following: a rectifier, which is configured to generate the supply voltage from a mains AC voltage, and an intermediate circuit capacitor, which is configured to buffer the supply voltage and to filter out disturbances originating from the inverter. The method will then comprise the following additional steps: prior to step a), as the magnitude of the mains AC voltage declines, i.e. during the decaying half-wave, the intermediate circuit capacitor is progressively discharged to a voltage which lies within a predefined voltage range about the value of the instantaneous mains AC voltage, wherein the inverter is actuated appropriately. The predefined voltage range can lie, for example, a few volts in excess of the value of the instantaneous mains AC voltage, for example between 3 V and 10 V. This step is executed until such time as the mains AC voltage passes through a zero-crossing and/or the supply voltage assumes a value below 10 V, and particularly below 5 V. Steps a) to c) are then repeated as the value of the mains AC voltage increases. Steps a) to c) can be repeated, for example, in a voltage range of the mains AC voltage between approximately 5 V and 80 V, and particularly between 10 V and 50 V.

According to one form of embodiment, the inverter, during steps a) to e), is actuated in a heating power setting-independent manner, and prior to and/or subsequently to steps a) to e) is actuated in a heating power setting-dependent manner wherein, for example, a pulse duty factor of the pulse-width modulation and/or a period of oscillation of the pulse-width modulation of the excitation voltage is/are set in a correspondingly heating power-dependent manner.

According to one form of embodiment, in step a), additionally, the first harmonic and/or a higher harmonic of the pulse-width modulated excitation voltage, or of a voltage which is dependent thereupon, is/are determined, in step b), additionally, the first harmonic and/or a higher harmonic of the measured oscillating circuit current is/are determined and, in step c), oscillating circuit parameters are determined in accordance with the determined first harmonic and/or the determined higher harmonic of the pulse-width modulated excitation voltage, or the voltage which is dependent thereupon, and in accordance with the determined first harmonic and/or the determined higher harmonic of the measured oscillating circuit current.

According to one form of embodiment, the first harmonics and/or the higher harmonics are determined by means of low-pass filters and/or by means of Fourier analysis.

If necessary, higher harmonic currents and voltages can also be determined by means of Fourier analysis, and the corresponding higher harmonic impedances can be calculated.

According to one form of embodiment, a period of oscillation of the pulse-width modulated excitation voltage can be selected such that it is shorter than a period of oscillation of a self-resonant oscillation of the oscillating circuit. In other words, the frequency of the pulse-width modulated excitation voltage is higher than the resonant frequency of the oscillating circuit, for the majority of conventional proprietary cookware. If the period of oscillation of the selected excitation voltage is excessively close to the natural resonance, the period of oscillation can be shortened, in order to limit the oscillating circuit current to a relevant level.

According to one form of embodiment, the induction hob comprises further induction heating coils, which are likewise supplied with the rectified mains AC voltage, by the interposition of associated rectifiers, wherein, during steps a) to e), in a time interval about the zero-crossing of the mains AC voltage, the further induction heating coils are not supplied with the rectified mains AC voltage. The time interval about the zero-crossing can commence, for example, 1 ms in advance of the zero-crossing and end 2 ms after the zero-crossing.

The induction hob is configured for the execution of the above-mentioned method, and comprises the following: at least one inverter, which is supplied with a supply voltage, at least one capacitor, an induction heating coil, wherein the at least one capacitor and the induction heating coil are interconnected such that they constitute an oscillating circuit, and wherein the inverter is configured to generate a pulse-width modulated excitation voltage for the oscillating circuit from the supply voltage, and a control unit, which is configured to actuate the inverter such that an above-mentioned method is executed.

Conventionally, by means of a vessel detection function, it is established whether or not an appropriate cooking vessel is positioned on a hob plate. In other words, a check is executed as to whether no vessel, an inappropriate vessel, or an excessively small vessel is present on the induction heating coil.

In flat-surface hobs, or for the detection of cooking vessel size, coverage of the hob plate is additionally required as an operating variable, and is preferably continuously resolved between a margin of 0% and 100% coverage of the active surface of the induction heating coil. For the determination of coverage, for example, the impedance or the (equivalent) electrical parameters R and L of the induction heating coil, with the cooking vessel positioned thereupon, can be measured, as these vary substantially in response to a variation in coverage.

However, these equivalent parameters—in addition to dependence upon coverage of the hob plate—are also dependent upon the cooking vessel materials employed, and upon the temperature of the base of the cooking vessel. These parameters are further dependent upon magnetic excitation, or the current flowing in the inductor, and the excitation frequency, as a result of which, conventionally, measurement is preferably executed with constant excitation.

According to the invention, the determination of oscillating circuit parameters is executed at excitations of differing magnitudes, i.e., for example, at different supply voltages to a half-bridge of a series oscillating circuit, or at different current strengths in a parallel oscillating circuit.

Preferably, the measurement of oscillating circuit parameters can be executed before or after a mains zero-crossing of a mains AC supply voltage, wherein the rising or decaying mains AC voltage can be employed for variable excitation, and the voltage characteristic-dependent or input voltage-dependent differential in oscillating circuit parameters can be used as additional information for cooking vessel detection, thereby improving the distinction of cooking vessel materials. In particular, during excitation or at a supply voltage of less than 80 V, differing variations in oscillating circuit parameters are detectable, depending upon the cooking vessel material. Above this voltage, a switchover can be executed from oscillating circuit parameter measuring operation to power output operation, such that measurement can be executed during operation, and no significant interruption in power output is required for the purposes of measurement. The voltage threshold for the switchover to heating operation can be determined in a variable manner, according to the current flowing in the induction heating element.

In conventional methods, only a limited distinction is possible as to whether values for impedance or oscillating circuit parameters are associated with (reduced) coverage or with a (lower resistance) conductivity of the cooking vessel material, i.e. a number of measuring results have a multiple significance, particularly on the grounds of the further variation in the temperature of the cooking vessel in place on the hob.

According to the invention, for the expanded detection of a cooking vessel, the impedance or oscillating circuit parameters with the cooking vessel (at least partially) in place are determined, wherein the electrical oscillating circuit comprised of the induction heating coil and at least one oscillating circuit capacitor is excited in a defined manner, and electrical oscillating circuit parameters such as the apparent resistance Z, the active resistance R, the reactive resistance X, the oscillating circuit inductance L or the phase angle between R and X are determined from the measurement of current flowing in the induction heating coil and the excitation voltage. Basic calculation formulae, for exemplary purposes, are set out below, in which:

$f_{op}$ represents the working frequency of the inverter
$u(t)$ represents the temporal characteristic of the actuation voltage
$i(t)$ represents the temporal characteristic of the current flowing in the induction heating coil,
Such that $\omega_{op}=2\cdot\pi\cdot f_{op}$
$u_1=\hat{u}_1\cdot\sin(\omega_{op}\cdot t)$ is the first voltage harmonic
$I_1=\hat{I}_1\cdot\sin(\omega_{op}\cdot t+\varphi)$ is the first current harmonic
where $\varphi=\sphericalangle(u_1, I_1)$
Such that:

$$R_1 = \frac{\hat{u}_1}{\hat{I}_1}\cdot\cos\varphi$$

$$X_1 = \frac{\hat{u}_1}{\hat{I}_1}\cdot\sin\varphi = X_{L1} + X_{C1}$$

$$\text{where } X_C = \frac{1}{\omega_{op}\cdot C}$$

$$L_1 = \frac{X_1 - X_{C1}}{\omega_{op}}$$

Preferably, the output excitation voltage of the inverter is measured although, as an alternative, it is also possible for the voltage across the induction heating coil to be measured directly. Oscillating circuit parameters such as quality of conformance Q, damping δ, the natural frequency fr or period of oscillation Tr can also be determined, in order to permit the determination therefrom of the coverage of the inductor by the cooking vessel.

According to the invention, as an input variable, the voltage (or, in general, the current flowing in the induction heating coil) is varied, such that at least one additional variable for the determination of the load which is positioned thereupon is obtained (detection of cooking vessel), for example, the variation in one or more oscillating circuit parameters in relation to a variation in the excitation voltage or current. The position of a maximum value of an oscillating circuit parameter, in relation to the variable excitation voltage, can also be employed as a criterion. Alternatively, oscillating circuit parameters can otherwise be evaluated by reference to the variable excitation voltage or, in a variable manner, by reference to the current flowing in the induction heating coil.

Variations in oscillating circuit parameters associated with the variation in voltage deliver additional variables, which permit the more accurate distinction of categories of cooking vessel materials, notwithstanding the variable coverage of the induction heating coil by a vessel.

The provision of a variable supply voltage or excitation voltage can be complex, on the grounds of which, according to the invention, the mains AC voltage can be employed as a variable voltage, i.e. measurement of oscillating circuit parameters can be executed in a time interval which precedes or follows a zero-crossing of the mains AC voltage. Measurement is preferably executed subsequently to a zero-crossing of the mains voltage, wherein the discharging of the intermediate circuit must then be reliably confirmed beforehand, such that the impedance is reduced to a minimum value, and control parameters for the inverter are selected correspondingly (=> with an actuation frequency a few kHz above the resonant frequency of the oscillating circuit and/or with a pulse duty factor close to the maximum value of 50%).

For the calculation of oscillating circuit parameters, the first harmonic of the excitation voltage and current are preferably employed. To this end, a low-pass filter can be provided or, alternatively, a corresponding Fourier analysis of measuring data can be executed by an algorithm.

Measurement commences, for example, shortly after the zero-crossing of the mains voltage, for example at a mains AC voltage of 8 V, and terminates at 40-50 V, whereafter the inverter switches over to operation in a conventional heating power output mode. This voltage range for cooking vessel detection permits a distinction to be drawn between differences resulting from the various permeability curves associated with cooking vessel materials, but also permits a prompt switchover to heating operation, such that large heating capacities can also be transmitted, and the requirement for the limitation of mains current harmonics can be observed.

Once cooking vessel classification has been executed, the voltage characteristic-dependent determination or delta determination of operating variables can be omitted, and the switchover to heating operation can be executed, even at lower voltages. In this form of operation, only the establishment of a variation in coverage is required.

The approach according to the invention for the implementation of a cooking vessel detection function with a variable excitation voltage permits the generation of additional oscillating circuit parameters or measuring variables for cooking vessel detection (with measurement of coverage) which, in particular, are associated with differing characteristic permeability curves for various cooking vessel materials, as a result of which a distinction can be drawn between results having a multiple significance. The voltage characteristic-dependent analysis or delta analysis permits a superior distinction of cooking vessel materials, as a result of which, in a second step thereafter, a cooking vessel material-specific determination of the coverage of the induction heating coil is permitted.

Exploitation of the rising mains AC voltage further to a zero-crossing permits a cost-effective implementation of a variable supply voltage of the inverter, and eliminates the necessity for power supply units having different output voltages for the differential excitation of the cooking vessel detection function.

Restriction of the switchover of the inverter for the measurement of the relevant operating variables to small rising voltages, up to a maximum of 80 V only, permits the execution of regular cooking vessel detection during running heating operation, as a result of which the requirement for the EMC-compliant limitation of mains current harmonics can also be observed.

In a first step, for example, a cooking vessel category can be determined and, in a second step, a degree of coverage which is specific to the cooking vessel material of this cooking vessel category can be determined.

BRIEF DESCRIPTION OF THE DRAWINGS

The invention is described in detail hereinafter, with reference to the drawings. In the drawings.

DETAILED DESCRIPTION OF THE EXEMPLARY EMBODIMENTS

Figure 1:
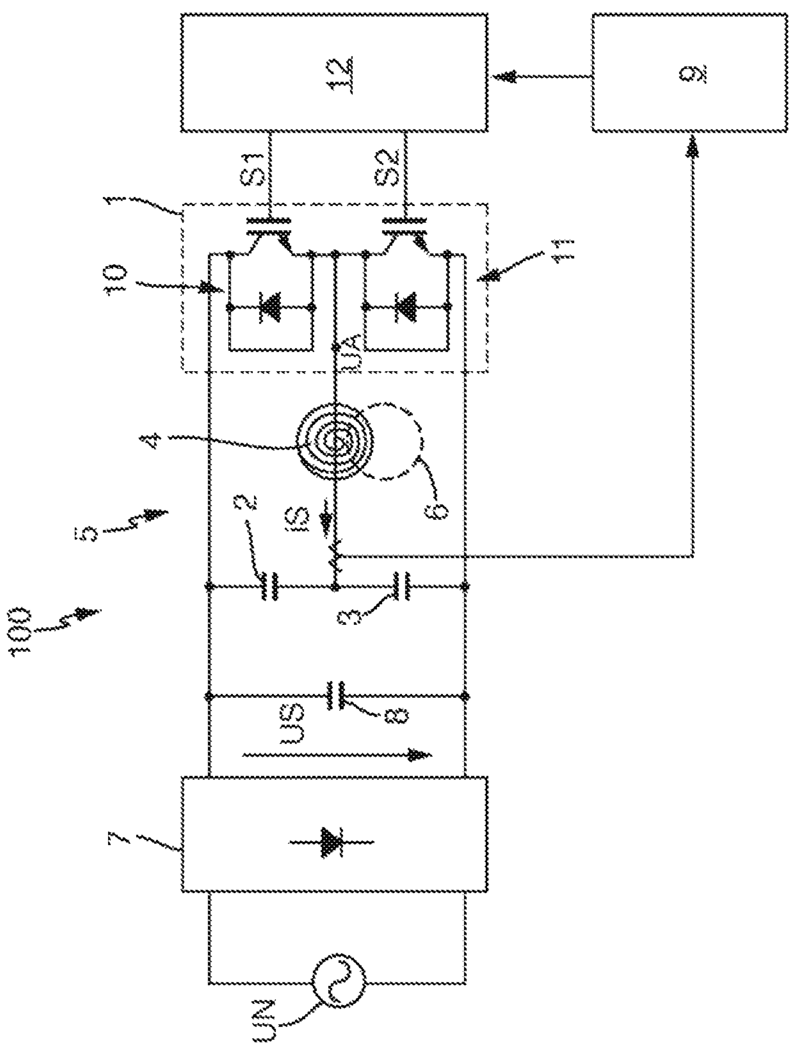
FIG. 1 shows an induction hob, which is configured for the execution of the method according to the invention.

FIG. 1 shows a schematic representation of a block circuit diagram of an induction hob 100, which is configured for the execution of the method according to the invention.

The induction hob 100 comprises a conventional inverter 1, which is supplied with a supply voltage US. The inverter 1 comprises two conventional semiconductor switching means 10 and 11, which are looped-in in series between the supply voltage US. At a connecting node point of the two semiconductor switching means 10 and 11, an excitation voltage output UA is delivered.

The induction hob 100 further comprises two capacitors 2 and 3, which are lopped-in in series between the supply voltage US.

The induction hob 100 further comprises an induction heating coil 4 (also described as an inductor). The induction heating coil 4 is looped-in between a connecting node point of the two capacitors 2 and 3 and the connecting node point of the two semiconductor switching means 10 and 11. The two capacitors 2, 3 and the induction heating coil 4 constitute a series oscillating circuit 5.

The inverter 1 is configured to generate the pulse-width modulated excitation voltage UA for the oscillating circuit 5 from the supply voltage US. The inverter 1 is actuated by means of a microprocessor-based control unit 9 having a down-circuit driver unit 12, as described in detail with reference to FIG. 2 hereinafter.

The induction hob 100 further comprises a rectifier 7, which is configured to generate the supply voltage US from a mains AC voltage UN, for example 230 V/AC and 50 Hz.

The induction hob 100 further comprises an intermediate circuit capacitor 8, which is configured for the buffering of the supply voltage US.

Figure 2:
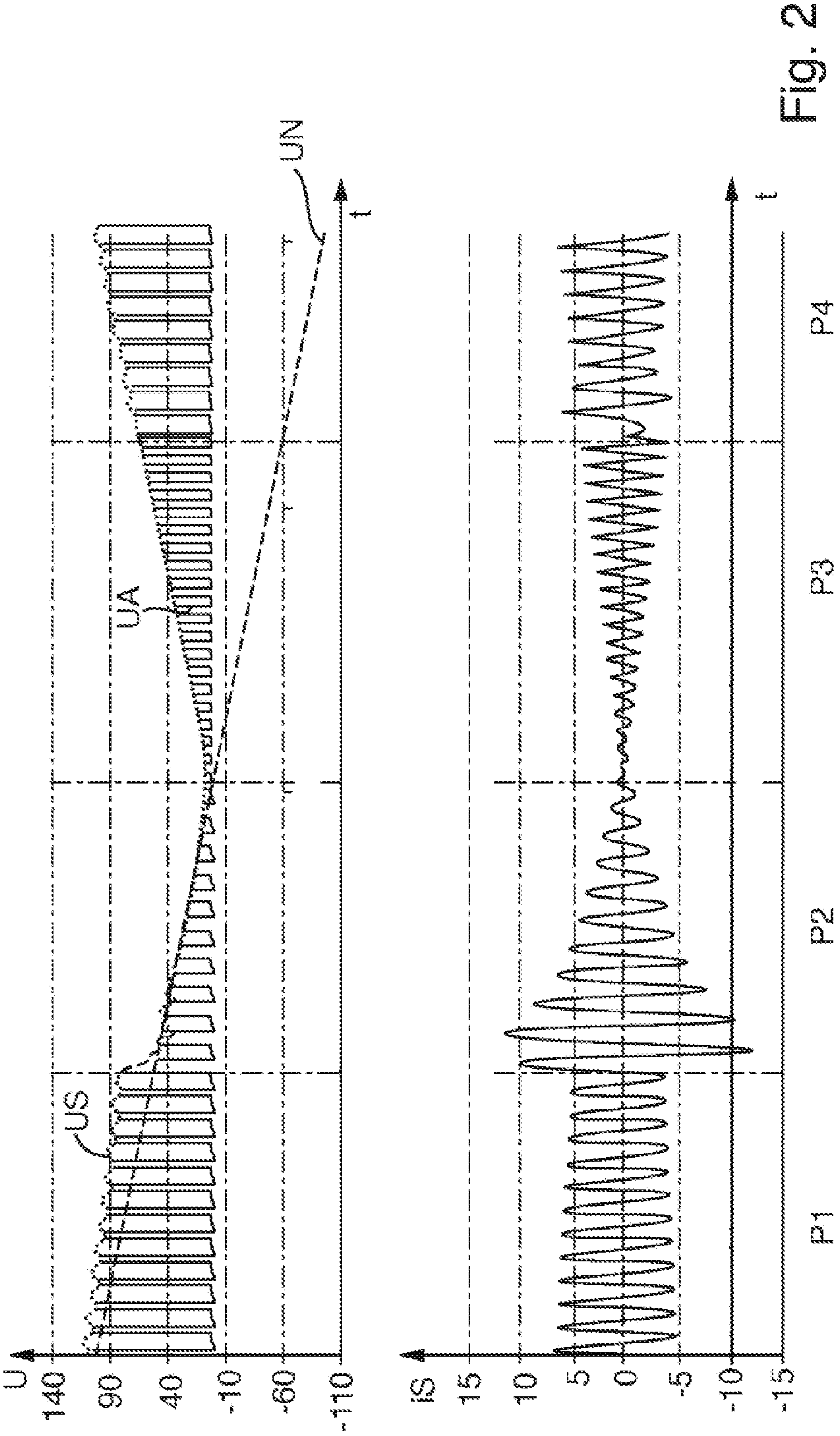
FIG. 2 shows voltage characteristics and current characteristics over time for the induction hob represented in FIG. 1.

FIG. 2 shows voltage characteristics and current characteristics, over time, for the induction hob 100 represented in FIG. 1. US represents the supply voltage, UA represents the excitation voltage, UN represents the mains AC voltage and iS represents the oscillating circuit current.

Four temporally sequential phases P1, P2, P3 and P4 of the method according to the invention are represented.

During phase P1, the excitation voltage UA is generated with pulse-width modulation, for the setting of a predefined and, in the present case, low heating capacity. The mains AC voltage UN decreases in a sinusoidal waveform. On the grounds of buffering by means of the intermediate circuit capacitor 8 and the low power output, the supply voltage US which is generated from the mains AC voltage UN by rectification remains above the mains AC voltage UN.

Phase P1 is followed by phase P2, during which the intermediate circuit capacitor 8, by the appropriate actuation of the inverter 1, is discharged to the magnitude of the instantaneous mains voltage UN.

In the time interval about the zero-crossing of the mains AC voltage, phase P2 ends and phase P3 commences, i.e. the actual measuring operation, during which the operating variables of the induction hob 100 which are to be established are determined or measured.

The operating variables comprise a degree of coverage of the induction heating coil 4 by a cooking vessel 6 which is to be heated, a material or material category of a base of the cooking vessel 6 which covers the induction heating coil 4, and a temperature of the base of the cooking vessel 6 which covers the induction heating coil 4.

To this end, the pulse-width modulated excitation voltage UA with a predefined voltage characteristic is generated, for example wherein one or two periods of the pulse-width modulated excitation voltage UA are generated with a predefined period of oscillation, a predefined pulse duty factor and a voltage difference between the low level and high level of pulse-width modulation which approximately corresponds to the instantaneous supply voltage US. The instantaneous supply voltage US, in turn, approximately corresponds to the instantaneous magnitude of the mains AC voltage UN.

A resulting oscillating circuit current iS is then measured by the induction heating coil 4, wherein electrical oscillating circuit parameters are calculated according to the instantaneous value of the supply voltage US, i.e. the instantaneous voltage characteristic of the excitation voltage US, and the measured oscillating circuit current iS.

As the magnitude of the mains AC voltage UN increases, the supply voltage US rises correspondingly such that, for the corresponding periods of pulse-width modulation, the voltage difference between the low level and the high level increases correspondingly, i.e. the voltage characteristic of the pulse-width modulated excitation voltage UA varies accordingly. A pulse duty factor of the pulse-width modulated excitation voltage UA and a period of oscillation of the pulse-width modulated excitation voltage UA remain constant.

For a number n of temporally sequential voltage characteristics of the pulse-width modulated excitation voltage UA, the resulting oscillating circuit currents iS are measured and, for each voltage characteristic of the n different voltage characteristics, the associated electrical voltage characteristic-dependent oscillating circuit parameters are determined or calculated, such that n voltage characteristic-dependent oscillating circuit parameters are determined. In other words, n different oscillating circuit parameters are determined for n different voltage characteristics.

Finally, operating variables of the induction hob 100 are determined from at least two oscillating circuit parameters of the n different voltage characteristic-dependent electrical oscillating circuit parameters.

For the calculation of a respective voltage characteristic-dependent electrical oscillating circuit parameter, the first harmonic of the respective pulse-width modulated excitation voltage UA, or a voltage which is dependent thereupon, can be determined, the first harmonics of the respectively measured oscillating circuit current iS are determined, and the respective electrical oscillating circuit parameter then determined in accordance with the first harmonic of the pulse-width modulated excitation voltage thus determined, or the voltage which is dependent thereupon, and the first harmonic of the measured oscillating circuit current. The first harmonics can be determined, for example, by means of low-pass filters and/or by Fourier analysis.

During phase P3, the inverter 1 is actuated in a heating power setting-independent manner, wherein a frequency of pulse-width modulation is preferably higher than a natural resonant frequency of the oscillating circuit 5.

Phase P3 spans a voltage magnitude range of the mains AC voltage UN from approximately 10 V to 50 V.

Phase P3 is followed by phase P4, during which the inverter 1 is again actuated in a heating power setting-dependent manner.

The induction hob 100 can comprise further induction heating coils, wherein the further induction heating coils are likewise supplied with the rectified mains AC voltage UN, and wherein the further induction heating coils, during phase P3, are not supplied with the rectified mains AC voltage UN, in order to prevent any crosstalk.

Figure 3:
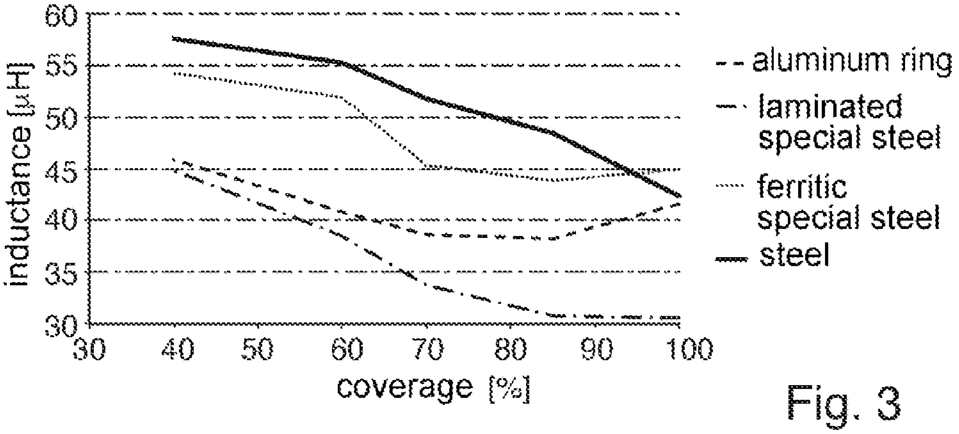
FIG. 3 shows an oscillating circuit inductance for various conventional proprietary cooking vessel materials, according to the coverage of an induction heating coil measured in the induction hob represented according to FIG. 1.

FIG. 3 shows an exemplary representation of a variable oscillating circuit inductance or a variable inductance of an induction heating coil, according to the coverage thereof by an item of cookware. Not only the inductance, but also the variation in inductance in relation to coverage are different, according to the various materials employed for the base of cookware.

Conventional proprietary materials for the base of cookware which is suitable for induction heating include, for example, ferritic special steel or steel. A particular case is constituted by cookware which is comprised of an aluminum body having a press-fit ferritic special steel base, for the purposes of induction heating. According to the invention, a distinction can also be drawn between single-layered ferritic special steel and multi-layered special steel laminates.

Figure 4:
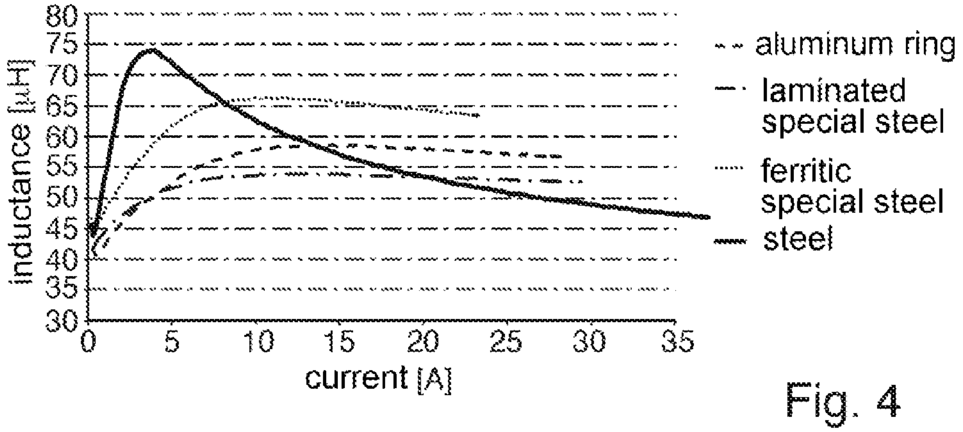
FIG. 4 shows an oscillating circuit inductance for various conventional proprietary cooking vessel materials, according to the current flowing in the induction heating coil, measured in the induction hob represented according to FIG. 1.

FIG. 4 represents the non-linear inductance characteristic of conventional proprietary cookware, according to the current flowing in the induction heating coil. The magnetic field strength of the induction heating coil is proportional to the current flowing in the induction heating coil, and constitutes the magnetic modulation of the cooking vessel material.

At low currents, the inductance rises in conjunction with the increasing permeability of ferritic materials, until increasing regions of the cooking vessel base achieve a state of ferritic saturation, and the inductance decays, to a varying degree, as modulation increases.

According to the invention, at least two working points of modulation are measured and considered in relation to one another, such that an additional measuring variable can then be employed for the determination of operating variables.

The invention claimed is:

1. A method for operating an induction hob (100), the method comprising the steps of:

a) providing the induction hob (100) that comprises: an inverter (1), which is supplied with a supply voltage (US), at least one capacitor (2, 3), and an induction heating coil (4), wherein the at least one capacitor (2, 3) and the induction heating coil (4) are interconnected such that they constitute an oscillating circuit (5), b) generating, via the inverter (1) a pulse-width modulated excitation voltage (UA) for the oscillating circuit (5) from the supply voltage (US), the pulse-width modulated excitation voltage (UA) having a predefined voltage characteristic, c) measure a resulting oscillating circuit current (iS), d) determine electrical oscillating circuit parameters, according to the voltage characteristic of the pulse-width modulated excitation voltage (UA) and the measured resulting oscillating circuit current (iS), e) repeat steps b) to d) n-times each time using a different voltage characteristic of the pulse-width modulated excitation voltage (UA) for the determination of electrical voltage characteristic-dependent oscillating circuit parameters, wherein for variation of the different voltage characteristics of the pulse-width modulated excitation voltage (UA), the supply voltage (US) is varied, and f) determine operating variables of the induction hob (100) based on the electrical voltage characteristic-dependent oscillating circuit parameters.

2. The method as claimed in claim 1, wherein a pulse duty factor of the pulse-width modulated excitation voltage (UA) and/or a period of oscillation of the pulse-width modulated excitation voltage (UA) remain/remains constant during steps b) to f).

3. The method as claimed in claim 1, wherein the operating variables are selected from the following:

degree of coverage of the induction heating coil (4) by a cooking vessel (6) which is to be heated, the material of the cooking vessel (6) which covers the induction heating coil (4), the temperature of a base of the cooking vessel (6) which covers the induction heating coil (4).

4. The method as claimed in claim 1, wherein:

the induction hob (100) further comprises the following:

a rectifier (7), which is configured to generate the supply voltage (US) from a mains AC voltage (UN), and an intermediate circuit capacitor (8), which is configured to buffer the supply voltage (US), wherein the method further comprises the following steps:

prior to step b), as the magnitude of the mains AC voltage (UN) declines, the intermediate circuit capacitor (8) is progressively discharged to a voltage which lies within a predefined voltage range about an instantaneous value of the mains AC voltage (UN), by actuating the inverter (1) appropriately, until such time as the mains AC voltage (UN) passes through a zero-crossing and/or the supply voltage (US) assumes a value below 10 V, and the subsequent repetition of steps b) to d) occur as the value of the mains AC voltage (UN) increases.

5. The method as claimed in claim 1, wherein during steps a) to e), the inverter (1) is actuated in a heating power setting-independent manner, and prior to and/or subsequently to steps b) to f), the inverter (1) is actuated in a heating power setting-dependent manner.

6. The method as claimed in claim 1, wherein:

in step b), additionally, a first harmonic and/or a higher harmonic of the pulse-width modulated excitation voltage (UA), or of a voltage which is dependent thereupon, is/are determined, in step c), additionally, the first harmonic and/or the higher harmonic of the measured oscillating circuit current (iS) is/are determined, and in step d), the electrical oscillating circuit parameters are determined in accordance with the determined first harmonic and/or the determined higher harmonic of the pulse-width modulated excitation voltage (UA), or the voltage which is dependent thereupon, and in accordance with the determined first harmonic and/or the determined higher harmonic of the measured oscillating circuit current (iS).

7. The method as claimed in claim 6, wherein the first harmonics and/or the higher harmonics are determined by means of low-pass filters and/or by means of Fourier analysis.

8. The method as claimed in claim 1, wherein a period of oscillation of the pulse-width modulated excitation voltage (UA) is selected such that it is shorter than a period of oscillation of a self-resonant oscillation of the oscillating circuit (5).

9. The method as claimed in claim 4, wherein the induction hob (100) comprises further induction heating coils, wherein the further induction heating coils are likewise supplied with a rectified mains AC voltage (UN), and wherein, during steps b) to f), in a time interval about the zero-crossing of the mains AC voltage (UN), the further induction heating coils are not supplied with the rectified mains AC voltage (UN).

10. A system comprising:

an induction hob (100) comprising:

an inverter (1), which is supplied with a supply voltage (US), at least one capacitor (2, 3), an induction heating coil (4), wherein the at least one capacitor (2, 3) and the induction heating coil (4) are interconnected such that they constitute an oscillating circuit (5), and wherein the inverter (1) is configured to generate a pulse-width modulated excitation voltage (UA) for the oscillating circuit (5) from the supply voltage (US), and a control unit (9) configured to actuate the inverter (1) to execute the method of claim 1.

11. The method as claimed in claim 1, wherein step c) occurs via the induction heating coil (4).

12. The method as claimed in claim 4, wherein the value is below 5 V.

* * * * *